(12) United States Patent
Scott et al.

(10) Patent No.: US 12,165,862 B2
(45) Date of Patent: Dec. 10, 2024

(54) APERTURE PLATE ASSEMBLY

(71) Applicant: Micromass UK Limited, Wilmslow (GB)

(72) Inventors: Edward Scott, Knutsford (GB); Peter Kerr, Wilmslow (GB); Stephen O'Brien, Manchester (GB)

(73) Assignee: Micromass UK Limited, Wilmslow (GB)

( * ) Notice: Subject to any disclaimer, the term of this patent is extended or adjusted under 35 U.S.C. 154(b) by 456 days.

(21) Appl. No.: 17/610,843

(22) PCT Filed: May 13, 2020

(86) PCT No.: PCT/GB2020/051164
§ 371 (c)(1),
(2) Date: Nov. 12, 2021

(87) PCT Pub. No.: WO2020/229819
PCT Pub. Date: Nov. 19, 2020

(65) Prior Publication Data
US 2022/0208537 A1    Jun. 30, 2022

(30) Foreign Application Priority Data
May 13, 2019 (GB) .................................. 1906701.6

(51) Int. Cl.
*H01J 49/06* (2006.01)
*G01N 27/623* (2021.01)
(Continued)

(52) U.S. Cl.
CPC .......... *H01J 49/067* (2013.01); *G01N 27/623* (2021.01); *H01J 49/0027* (2013.01); *H01J 49/401* (2013.01)

(58) Field of Classification Search
CPC ...... H01J 49/062; H01J 49/065; H01J 49/066; H01J 49/067; H01J 49/068; H01J 49/0027;
(Continued)

(56) References Cited

U.S. PATENT DOCUMENTS

| 6,239,429 | B1 | 5/2001 | Blessing et al. |
| 2009/0266997 | A1 | 10/2009 | Tieger et al. |

FOREIGN PATENT DOCUMENTS

| EP | 2266127 A1 | 12/2010 |
| GB | 1191519 A | 5/1970 |

(Continued)

OTHER PUBLICATIONS

International Search Report and Written Opinion for International Application No. PCT/GB2020/051164, mailed Jul. 23, 2020.
(Continued)

*Primary Examiner* — David E Smith
*Assistant Examiner* — Hsien C Tsai
(74) *Attorney, Agent, or Firm* — Goodwin Procter LLP (57) ABSTRACT

An aperture plate assembly for an analytical instrument comprises a first sub-assembly comprising an aperture plate and a second sub-assembly comprising a guide. The first sub-assembly is configured to be attached to the second sub-assembly such that the aperture plate is positioned in a first position relative to the second sub-assembly. The first sub-assembly and the second sub-assembly are configured such that when the first sub-assembly is engaged by the guide, the aperture plate can be moved into the first position and the first sub-assembly can be attached to the second sub-assembly.

13 Claims, 6 Drawing Sheets

(51) Int. Cl.
*H01J 49/00* (2006.01)
*H01J 49/40* (2006.01)

(58) Field of Classification Search
CPC .. H01J 49/401; H01J 49/4215; H01J 49/4255; H01J 2237/061
See application file for complete search history.

(56) References Cited

FOREIGN PATENT DOCUMENTS

| | | | |
|---|---|---|---|
| JP | S607054 A | 1/1985 | |
| JP | H0462749 A | 2/1992 | |
| JP | H04137446 A | 2/1992 | |
| JP | H06310090 A | 11/1994 | |
| WO | 2011046897 A1 | 4/2011 | |
| WO | WO-2013140139 A2 * | 9/2013 | ............ H01J 49/062 |
| WO | 2019229459 A1 | 12/2019 | |
| WO | 2019229465 A1 | 12/2019 | |

OTHER PUBLICATIONS

Search Report for GB Application No. GB1906701.6, mailed Oct. 24, 2019.
Combined Search and Examination Report For GB Application No. GB2007014.0, mailed Nov. 13, 2020.

* cited by examiner

APERTURE PLATE ASSEMBLY

CROSS-REFERENCE TO RELATED APPLICATIONS

This application is a U.S. national phase filing claiming the benefit of and priority to International Patent Application No. PCT/GB2020/051164, filed May 13, 2020, which claims priority from and the benefit of United Kingdom patent application No. 1906701.6 filed on May 13, 2019. The entire contents of these applications are incorporated herein by reference.

FIELD OF THE INVENTION

The present invention provides an aperture plate assembly for an analytical instrument such as a mass and/or ion mobility spectrometer.

BACKGROUND

Analytical instruments such as mass and/or ion mobility spectrometers typically comprise a number of functional components arranged in series. For example, Time-of-Flight (ToF) mass spectrometers typically comprise a Time-of-Flight mass analyser, and one or more functional components such as one or more ions guides, ion optics, and the like, arranged upstream of the Time-of-Flight mass analyser.

In these arrangements, one or more apertures may be arranged between adjacent functional components of the analytical instrument, and ions may be transmitted between adjacent components through the aperture(s). For example, ions may be transmitted into a Time-of-Flight mass analyser via an aperture.

In order to increase or maximise ion transmittance through an aperture that has a given size, the ion beam may be configured such that its size in one or both of its cross-sectional dimensions is close to, approximately equal to, or even slightly larger than the corresponding size of the aperture. However, this can lead to ions impacting upon the parts of the instrument that are immediately adjacent to the aperture. This can in turn lead to deposited material building up over time, which can then affect the ion transmittance through the aperture.

In these arrangements, it is accordingly common for an aperture to be provided as part of a removable aperture plate, where the aperture plate may be removed and cleaned or replaced. However, the removal, cleaning, and replacement of such aperture plates can be a complex and time-consuming task that must be performed by a highly skilled service engineer.

The Applicants believe that there remains scope for improvements to aperture plates and aperture plate assemblies.

SUMMARY

According to an aspect, there is provided an aperture plate assembly for an analytical instrument such as a mass and/or ion mobility spectrometer, the assembly comprising:

a first sub-assembly comprising an aperture plate; and a second sub-assembly comprising a guide, wherein the first sub-assembly is configured to be attached to the second sub-assembly such that the aperture plate is positioned in a first position relative to the second sub-assembly;

wherein the first sub-assembly and the second sub-assembly are configured such that when the first sub-assembly is engaged by the guide, the aperture plate can be moved into the first position and the first sub-assembly can be attached to the second sub-assembly.

Various embodiments relate to an aperture plate assembly for an analytical instrument comprising a first sub-assembly and a second sub-assembly.

The first sub-assembly comprises an aperture plate, and so may accordingly be referred to as an aperture plate sub-assembly. The aperture plate may comprise an aperture, which may be configured to allow ions to be passed through the aperture. The first sub-assembly may also comprise a control such as a handle which may be connected to the aperture plate so as to allow manipulation of the aperture plate.

The second sub-assembly may form part of, or may be attached to an analytical instrument such as a mass and/or ion mobility spectrometer. The second sub-assembly may be configured such that the first sub-assembly can be removably attached to the second sub-assembly (and so the second sub-assembly may be referred to as an attachment sub-assembly).

The sub-assemblies may be configured such that when the first sub-assembly is attached to the second sub-assembly, the aperture plate is positioned in a first position relative to the second sub-assembly (and accordingly relative to the analytical instrument). The first position may be such that when the aperture plate is positioned in the first position, ions (which are being processed and/or analysed by the analytical instrument) can pass through the aperture of the aperture plate.

The second sub-assembly comprises a guide such as a guide rod. The first sub-assembly may be configured to be (removably) engageable with the guide, such that when the first sub-assembly is engaged by the guide, movement of the first sub-assembly (relative to the second sub-assembly, and so relative to the analytical instrument) is constrained by the guide. For example, where the guide comprises a guide rod, the first sub-assembly may comprise a channel or passage, and the channel or passage and the guide rod may be configured such that when the channel or passage is arranged to (at least partially) surround the guide rod, movement of the first sub-assembly is constrained by the guide rod.

According to various particular embodiments, when the first sub-assembly is engaged by the guide, movement of the first sub-assembly may be constrained by the guide such that when the aperture plate is moved towards the first position, for example by pushing the (handle of the) first sub-assembly, the aperture plate is guided by the guide towards or into the first position. Thus, in various embodiments, the sub-assemblies are configured such that, when the first sub-assembly is engaged by the guide, the aperture plate can be pushed into the first position (using the control (handle)). In other words, pushing the control, such as a handle, causes the aperture plate to be moved towards or into (guided towards or into) the first position.

In addition to this, the sub-assemblies are configured such that the first sub-assembly can be attached to (secured to) the second sub-assembly (such that the aperture plate is positioned in the first position), for example using the control (handle). For example, as is described in more detail below, the control (handle) may comprise or may form part of an attachment device such as a thumb screw, whereby (when the aperture plate is positioned in the first position) manipulation (such as rotation) of the control (handle) relative to the aperture plate causes the first sub-assembly to become attached to (secured to) the second sub-assembly.

Thus according to various embodiments, the aperture plate assembly comprises a first sub-assembly comprising an aperture plate and a control such as a handle, and a second sub-assembly comprising a guide, and is configured such that when the first sub-assembly is engaged by the guide, the aperture plate can be moved (pushed) into its appropriate ("first") position relative to the second sub-assembly, for example using the control (handle), and can also be attached to (secured to) the second sub-assembly using the control (handle).

This means that the aperture plate can be attached, removed and/or replaced in a particularly accurate, convenient, and straightforward manner, for example only by manipulation of the control (handle). This in turn means that when it is desired to clean or replace the aperture plate, this can be done in a particular quick and straightforward manner.

It will accordingly be appreciated that various embodiments provide an improved aperture plate assembly.

Various embodiments also extend to the first and second sub-assemblies in their own right.

Thus, according to another aspect there is provided an aperture plate sub-assembly for an analytical instrument such as a mass and/or ion mobility spectrometer, the sub-assembly comprising:
an aperture plate; and
a control such as a handle;
wherein the sub-assembly is configured to be attached to an analytical instrument such that the aperture plate is positioned in a first position relative to the analytical instrument; and
wherein the sub-assembly is configured such that the when the sub-assembly is positioned in the first position, the sub-assembly can be attached to the analytical instrument using the control (handle).

The sub-assembly may be configured to be engaged by a guide.

The sub-assembly may be configured such that when the sub-assembly is engaged by the guide, the aperture plate can be moved into the first position and the sub-assembly can be attached to the analytical instrument, for example using the control (handle).

According to another aspect, there is provided an attachment sub-assembly for an analytical instrument such as a mass and/or ion mobility spectrometer, the sub-assembly comprising:
a guide; and
an attachment device;
wherein the attachment device is configured such that an aperture plate sub-assembly can be attached to the attachment sub-assembly such that an aperture plate of the aperture plate sub-assembly is positioned in a first position relative to the attachment sub-assembly; and
wherein the guide is configured such that when the aperture plate sub-assembly is engaged by the guide, the aperture plate can be moved into the first position.

The first sub-assembly may comprise a control such as a handle.

The first sub-assembly and the second sub-assembly may be configured such that when the first sub-assembly is engaged by the guide, the aperture plate can be moved into the first position using the control, for example using the handle.

The first sub-assembly and the second sub-assembly may be configured such that when the first sub-assembly is engaged by the guide, the aperture plate can be attached to the second sub-assembly using the control, for example using the handle.

The first sub-assembly and the second sub-assembly may be configured such that when the first sub-assembly is engaged by the guide, the aperture plate can be pushed into the first position, for example using the control (handle).

The guide may comprise a protrusion, and the first sub-assembly may comprise a channel or passage configured to accommodate the protrusion.

The first sub-assembly may comprise a protrusion, and the guide may comprise a channel or passage configured to accommodate the protrusion.

The guide may comprise a rod.

The first sub-assembly may comprise one or more first faces.

The second sub-assembly may comprise one or more corresponding second faces.

The first and second faces may be configured such that when the aperture plate is positioned in the first position, at least part of the one or more first faces contacts at least part of the one or more second faces.

The first sub-assembly and the second sub-assembly may be configured such that when the first sub-assembly is engaged by the guide, the aperture plate can be moved into the first position by pushing the first sub-assembly until at least part of the one or more first faces comes into contact with at least part of the one or more second faces.

The first sub-assembly may be configured such that the first sub-assembly can be attached to the second sub-assembly by moving at least part of the control (handle) relative to the aperture plate.

The first sub-assembly may be configured such that the first sub-assembly can be attached to the second sub-assembly by rotating at least part of the control (handle) relative to the aperture plate.

The first sub-assembly may comprise an attachment device such as an attachment fitting.

The second sub-assembly may comprise a complimentary attachment device such as a complimentary attachment fitting.

The first sub-assembly and the second sub-assembly may be configured such that when the aperture plate is positioned in the first position, the attachment device can be attached to the complimentary attachment device, for example using the control (handle).

The attachment device may be arranged in or protrude from one of the one or more first faces.

The complimentary attachment device may be arranged in or protrude from one of the one or more second faces.

The first sub-assembly may be configured such that rotation of at least part of the control relative to the aperture plate causes rotation of the attachment device relative to the aperture plate.

The handle may be connected to the attachment device such that rotation of the handle relative to the aperture plate causes rotation of the attachment device relative to the aperture plate.

The second sub-assembly may comprise a clip configured to retain the aperture plate in the first position.

According to an aspect there is provided an analytical instrument comprising the assembly or sub-assembly described above.

The aperture plate may comprise an aperture.

The analytical instrument may be configured such when the aperture plate is positioned in the first position, ions can pass through the aperture.

The analytical instrument may comprise a mass analyser such as a time of flight mass analyser.

The assembly or sub-assembly may form part of and/or may be arranged adjacent to the mass analyser.

The mass analyser may comprise an acceleration assembly.

The assembly or sub-assembly may form part of and/or may be arranged adjacent to the acceleration assembly.

The analytical instrument may comprise an access panel or flange.

The access panel or flange may be configured to allow access to the assembly or sub-assembly.

According to an aspect there is provided a method of mass and/or ion mobility spectrometry, the method comprising passing ions through an aperture of the assembly or sub-assembly described above.

Each of the aspects and embodiments described herein can, and in various embodiments do, include any one or more or all of the features described herein.

BRIEF DESCRIPTION OF THE DRAWINGS

Various embodiments of the present invention will now be described, by way of example only, and with reference to the accompanying drawings in which.

DETAILED DESCRIPTION

Figure 1:
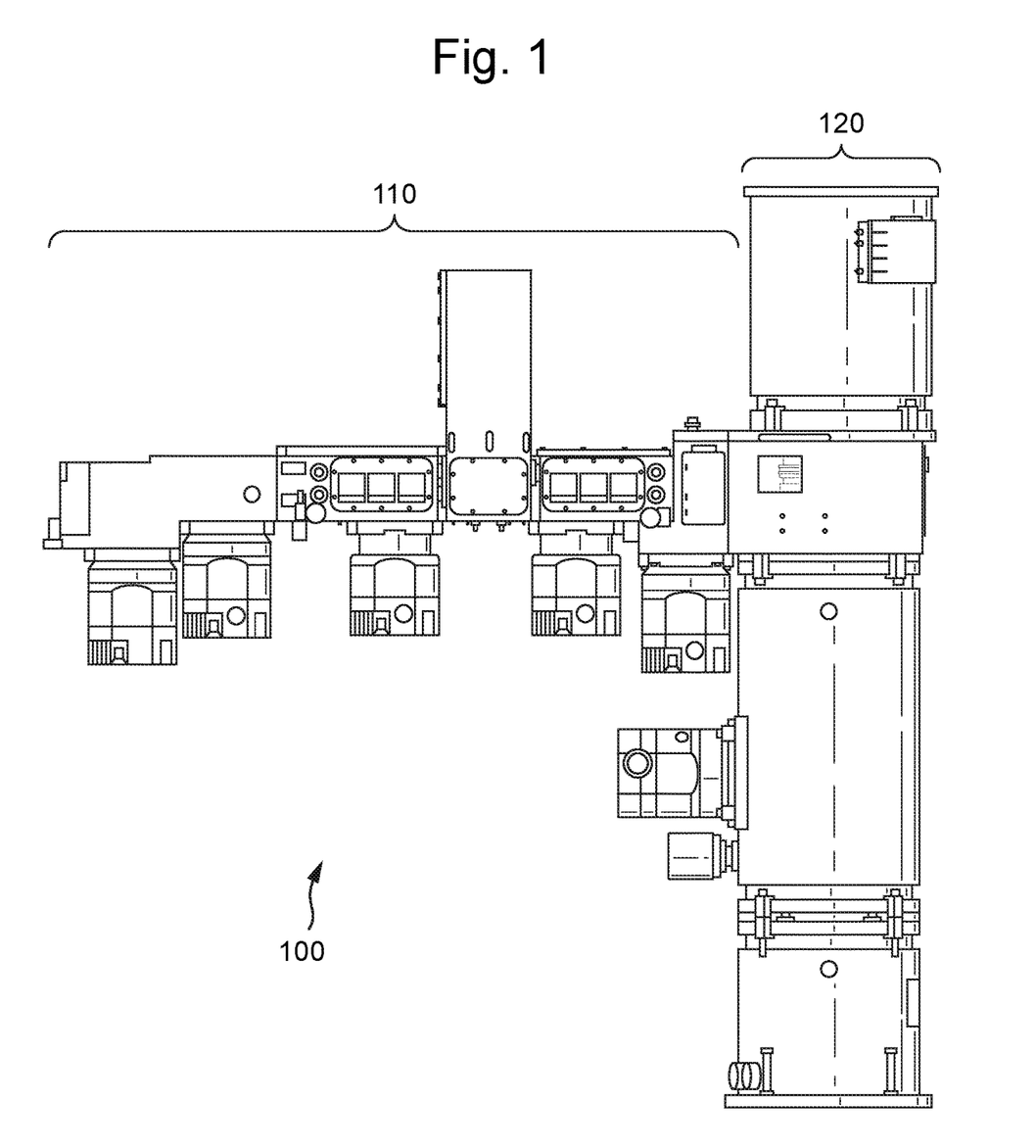
FIG. 1 shows schematically a side view of a part of an analytical instrument in accordance with various embodiments.

FIG. 1 shows a side view of an analytical instrument 100 such as a mass and/or ion mobility spectrometer in accordance with various embodiments.

The analytical instrument 100 may comprise multiple functional components arranged in series. As shown in FIG. 1, the analytical instrument 100 may comprise multiple vacuum chambers arranged in series, where each of the vacuum chambers contains one or more of the functional components.

The analytical instrument 100 may comprise an ion source configured to generate ions (not shown in FIG. 1), optionally within one of the vacuum chambers or in an atmospheric pressure region of the analytical instrument 100. The ion source may be operated at or close to atmospheric pressure, or otherwise at a relatively high pressure. The ion source may comprise any suitable ion source. The analytical instrument 100 may optionally also comprise a chromatography or other separation device upstream of (and coupled to) the ion source (not shown in FIG. 1).

Downstream from the ion source, and within one or more of the vacuum chambers, the analytical instrument 100 may comprise any one or more further functional components or devices 110, as desired. The one or more further functional components or devices 110 may be operated at any suitable pressure, such as for example an intermediate pressure.

The one or more further functional components or devices 110 may comprise, for example, one or more ion guides, one or more ion traps, and/or one or more mass filters. Equally, the one or more further functional components or devices 110 may comprise an activation, collision, fragmentation or reaction device configured to activate, fragment or react the ions. Equally, the one or more further functional components or devices 110 may comprise an ion mobility separator configured to separate the ions according to their ion mobility.

According to various particular embodiments, the analytical instrument 100 comprises a mass analyser 120, which may be arranged in the final vacuum chamber of the analytical instrument 100. The mass analyser 120 may be operated at a relatively low pressure.

In various particular embodiments, and as shown in FIG. 1, the mass analyser 120 comprises an orthogonal acceleration Time of Flight mass analyser. However, more generally the mass analyser 120 may comprise any suitable mass analyser such as a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

Thus according to various embodiments, the analytical instrument 100 comprises an ion source (which may be operated at a relatively high pressure such as at atmospheric pressure), a mass analyser 120 arranged downstream from the ion source (which may be operated at a relatively low pressure), and one or more further functional components or devices 110 arranged between the ion source and the mass analyser 120 (where one or more or each of the one or more further devices may be operated at one or more intermediate pressures).

In operation, ions generated by the ion source may be transmitted from one functional component to the next, for example in a generally horizontal direction, before reaching the mass analyser 120 whereupon the ions may be orthogonally accelerated, for example so that the ions then travel in a generally vertical direction, and detected.

According to various particular embodiments, one or more pairs of adjacent functional components, devices or vacuum chambers 110 of the analytical instrument 100 are connected by one or more apertures, and ions (generated by the ion source) may be transmitted between adjacent functional components, devices or vacuum chambers via the aperture(s).

As described above, and according to various embodiments, in order to increase or maximise ion transmittance through an aperture that has a given size, the ion beam may be configured (in one or more locations) such that its size in one or both of its cross-sectional dimensions is close to, approximately equal to, or slightly larger than the corresponding size of the aperture.

This may be the case in respect of any one or more of the aperture(s) of the analytical instrument 100, but may particularly be the case for the aperture through which ions pass as they enter the mass analyser 120.

Figure 2:
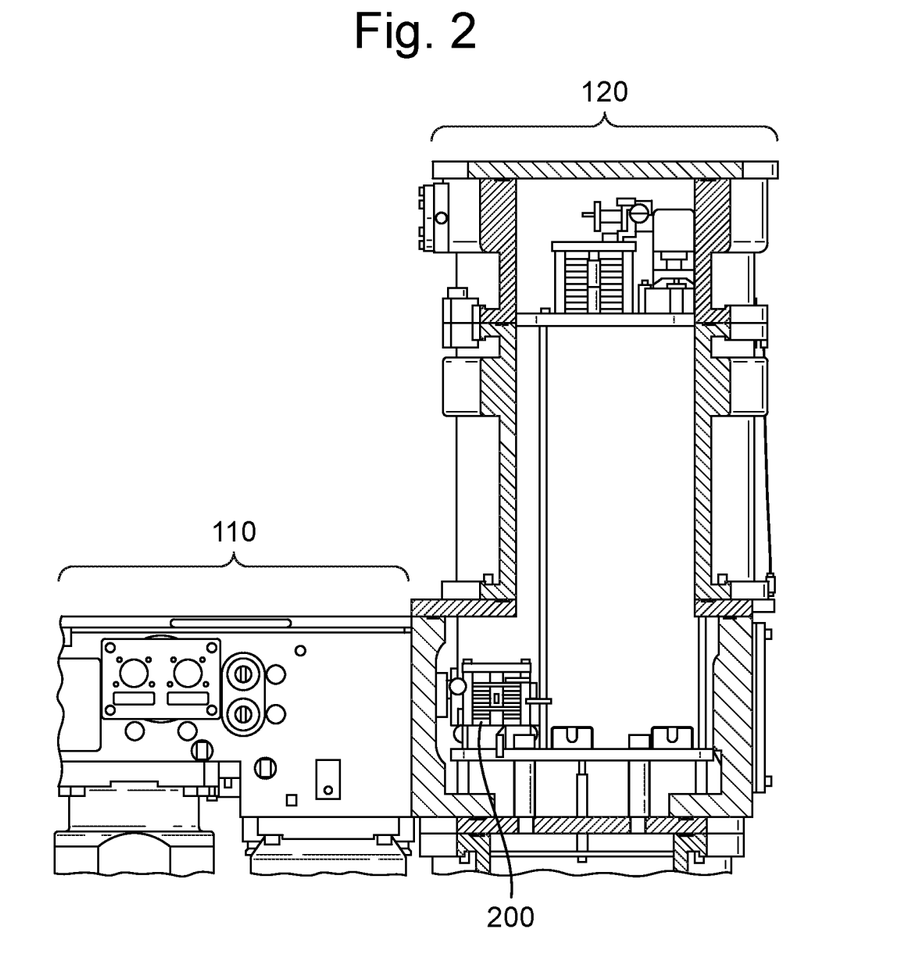
FIG. 2 shows schematically a cross sectional view of a part of an analytical instrument in accordance with various embodiments.

FIG. 2 shows a cross sectional view of a portion of the analytical instrument 100 shown in FIG. 1. As shown in FIG. 2, the orthogonal acceleration Time of Flight mass analyser 120 comprises an acceleration assembly 200, which may be arranged at or close to the entrance of the mass analyser 120. The acceleration assembly 200 may be configured to orthogonally accelerate ions (when they enter the Time of Flight mass analyser 120) into a drift region of the Time of Flight mass analyser 120. In order to do this, the acceleration assembly 200 may comprise one or more acceleration electrodes, which may be connected to one or more voltage sources.

In these embodiments, it may be desired to condition the ion beam prior to it entering the mass analyser 120, for example so that it has a ribbon-like form. This may be desirable, for example, so that the ion beam is in an appropriate form for being efficiently orthogonally accelerated by the acceleration assembly 200 (and analysed by the mass analyser 120).

In various embodiments, an aperture between the mass analyser 120 and the one or more functional components or devices immediately upstream of the mass analyser 120 (which may be, for example, a transfer region and/or ion optics), may be in the form of a slot, and in order to increase or maximise ion transmittance through the slot, the ion beam may be configured such that at least its width is close to, approximately equal to, or slightly larger than the width of the slot.

More generally however, an aperture of the analytical instrument 100 may have any suitable shape (such as being circular), and the ion beam may be configured such that its size in one or both of its cross-sectional dimensions is close to, approximately equal to, or even slightly larger than the corresponding size of the aperture.

As described above, arranging the ion beam such that its size in one or both of its cross-sectional dimensions is close to, approximately equal to, or slightly larger than the corresponding size of an aperture can lead to ions impacting upon the parts of the instrument that are immediately adjacent to the aperture, which can in turn lead to material building up over time, which can then affect the ion transmittance through the aperture.

Thus according to various embodiments, an aperture of the analytical instrument 100, such as an aperture (slot) arranged between the mass analyser 120 and the one or more functional components or devices immediately upstream of the mass analyser 120, is provided as part of a removable aperture plate. The aperture plate may be removed and cleaned or replaced, for example periodically, or when sufficient material has built up upon the aperture plate to require cleaning or replacement.

However, as described above, in conventional arrangements, the removal, cleaning, and replacement of an aperture plate can be a complex and time-consuming task that must be performed by a highly skilled service engineer.

For example, in order to access the aperture plate in some conventional arrangements, it may be necessary to dissemble or remove some or all of the mass analyser assembly. This is undesirable as the mass analyser is a complex assembly which is assembled with relatively small tolerances. As such, dissembling or removing (and subsequently re-assembling) some or all of the mass analyser assembly is not only time consuming and complex task in itself, but will normally also necessitate a full recalibration of the instrument.

In addition, in conventional arrangements, the aperture plate is typically attached to the rest of the instrument using screws, which may be difficult to access, may be tightened incorrectly, and/or may be accidently lost.

Figure 3:
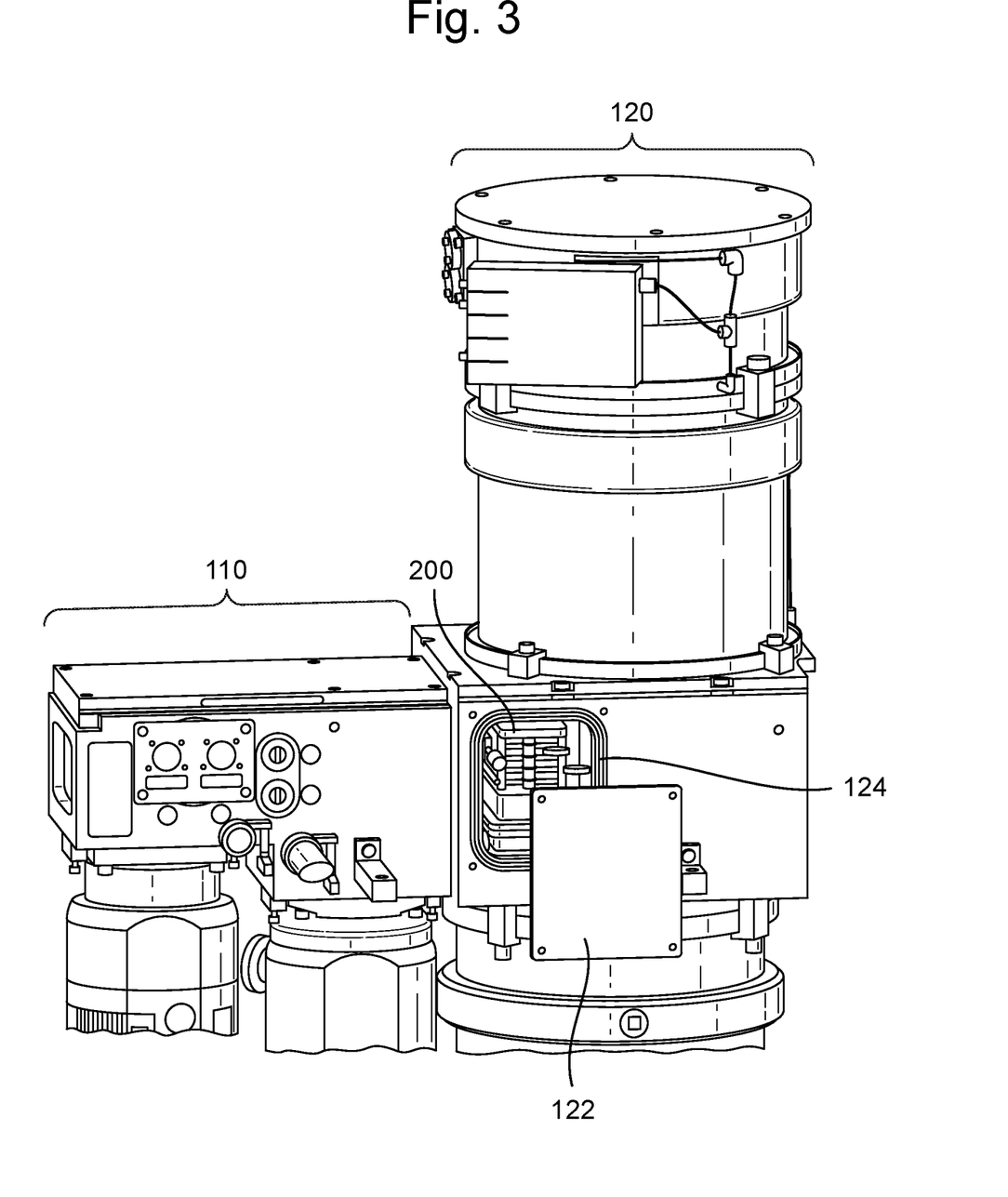
FIG. 3 shows schematically an exploded side view of a part of an analytical instrument in accordance with various embodiments, where an access panel has been removed.
Figure 4:
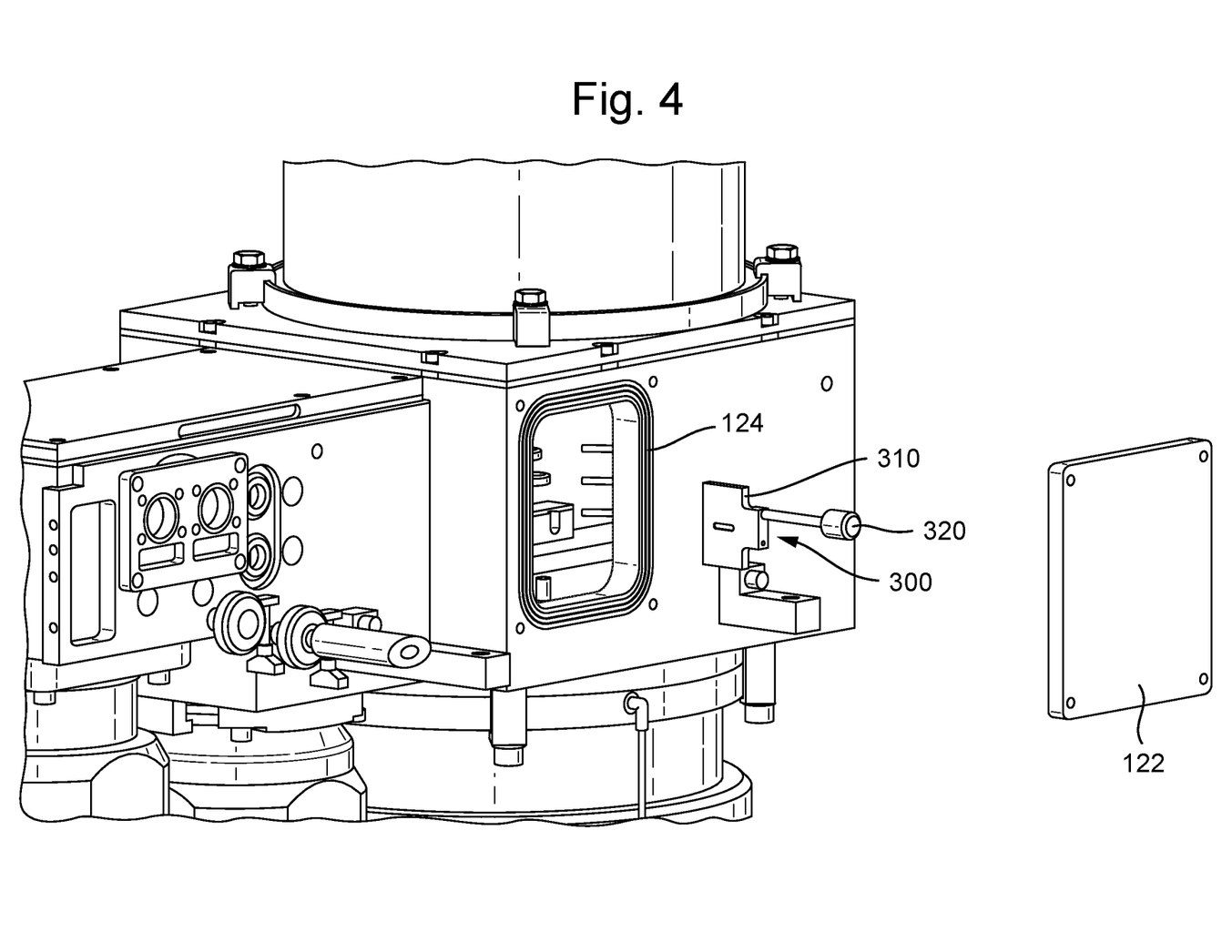
FIG. 4 shows schematically an exploded view of a part of an analytical instrument in accordance with various embodiments, where an access panel and an aperture plate sub-assembly have been removed.

As shown in FIGS. 3 and 4, various embodiments relate to an aperture plate assembly comprising an aperture plate 310 which may be accessed, removed and replaced via an access panel 122 of an analytical instrument 100.

Thus, according to various embodiments, the analytical instrument 100 comprises an access panel or flange 122 which is configured to allow access to an aperture plate 310 (and more generally to an aperture plate assembly 300 and/or an acceleration assembly 200). The access panel or flange 122 may be part of and/or connected to a vacuum chamber housing of the analytical instrument 100, such as the vacuum chamber housing of the mass analyser 120. The access panel or flange 122 may be part of and/or connected to the part of the vacuum chamber housing of the analytical instrument 100 that is immediately adjacent to the acceleration assembly 200, such as the part of the vacuum chamber housing of the mass analyser 120 that is immediately adjacent to the acceleration assembly 200.

The access panel or flange 122 may be provided as part of and/or connected to a top or bottom (horizontal) surface of the analytical instrument 100, for example as part of and/or connected to the top or bottom of the vacuum chamber housing of the mass analyser 120. However, as shown in FIGS. 3 and 4, according to various particular embodiments, the access panel or flange 122 is provided as part of and/or connected to a side (vertical) surface of the analytical instrument 100, for example as part of and/or connected to a side surface of the mass analyser 120 vacuum chamber housing. This is particularly convenient where, as shown in FIGS. 1-3, the mass analyser 120 comprises an orthogonal acceleration Time of Flight mass analyser 120 that has a time of flight region that extends (significantly) both above and below the acceleration assembly 200.

The access panel or flange 122 may have a suitable size and shape to allow access to the aperture plate 310, aperture plate assembly 300 and/or acceleration assembly 200. For example, the access panel or flange 122 may comprise a square or rectangular plate, and may be removably attached to the vacuum chamber housing of the mass analyser 120 so as to cover a corresponding (square or rectangular) access hole in the vacuum chamber housing of the mass analyser 120.

As is illustrated by FIG. 4, various embodiments allow a service engineer to straightforwardly access and remove the aperture plate 310 (via the access hole), for example by firstly removing the access panel or flange 122 so as to obtain access to the aperture plate sub-assembly 300, and then manipulating a control such as a handle 320 of the aperture plate sub-assembly 300 so as to remove the aperture plate sub-assembly 300.

The aperture plate 310 can then be cleaned as needed and replaced, or a new aperture plate 310 can be installed in the place of the removed aperture plate 310. This can be done in a particularly straightforward and convenient manner, without, for example, having to remove or dissemble other parts of the mass analyser assembly 120 which may have relatively small tolerances and which may (significantly) affect the performance of the instrument 100.

Once the aperture plate 310 has been replaced, the access panel or flange 122 may then be replaced, for example by attaching it to the vacuum chamber housing of the mass analyser 120 using fasteners such as screws or Allen bolts. One or more seals 124, such as one or more o-rings, may be provided in the vacuum chamber housing and/or as part of the access panel or flange 122, so as to provide a gas tight seal between the access panel or flange 122 and the vacuum chamber housing.

According to various particular embodiments, the aperture plate sub-assembly 300 (and the aperture plate 310) is removably attachable to the analytical instrument 100. In this regard, according to various embodiments, (the mass analyser 120 of) the analytical instrument 100 may comprise an (attachment) sub-assembly to which the aperture plate sub-assembly 300 may be attached. The attachment sub-assembly may form part of, or may be attached to (the acceleration assembly 200 of) the mass analyser 120. Other arrangements would, however, be possible.

The aperture plate 310 can be moved into the "first" position, and the aperture plate sub-assembly 300 may be attached to the attachment sub-assembly without having to dissemble, remove or disturb the attachment sub-assembly from the analytical instrument 100.

Figure 5A:
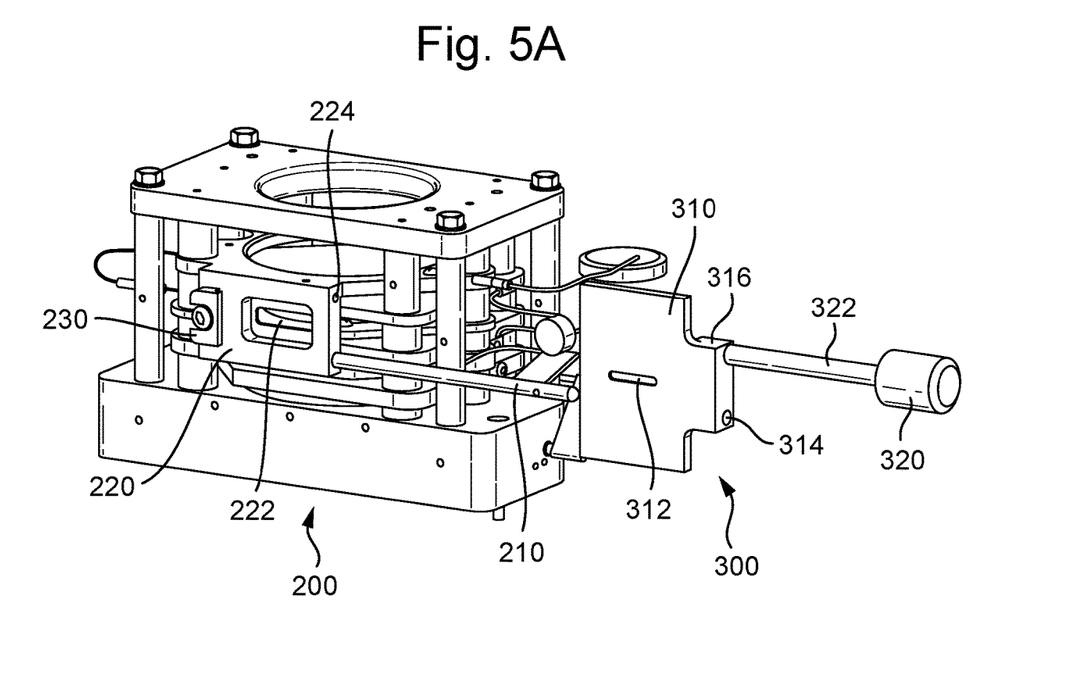
FIG. 5A shows schematically a front view of a pusher assembly and an aperture plate sub-assembly in accordance with various embodiments.
Figure 5B:
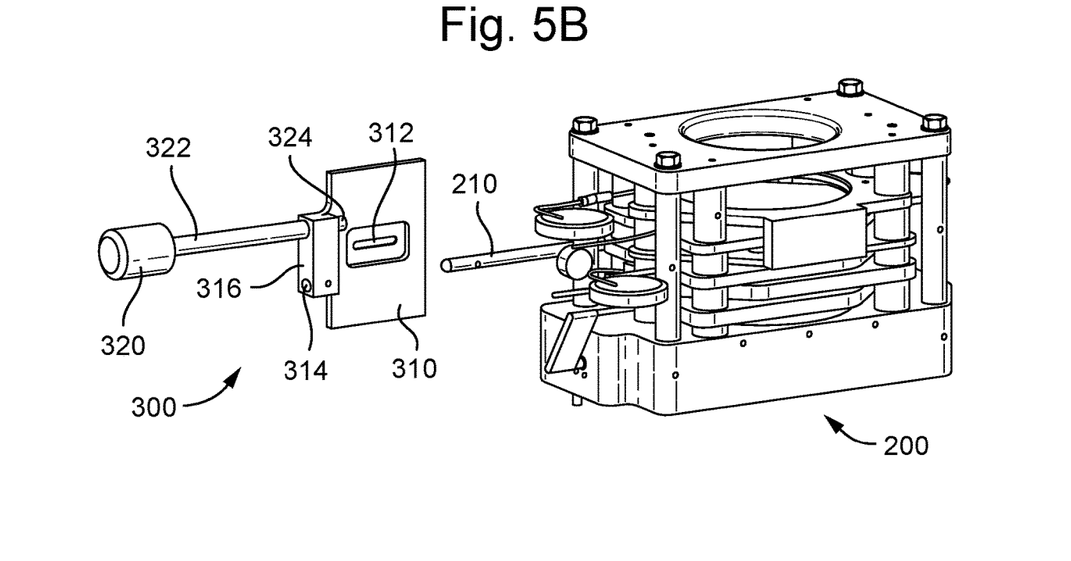
FIG. 5B shows schematically a rear view of a pusher assembly and an aperture plate sub-assembly in accordance with various embodiments.
Figure 6:
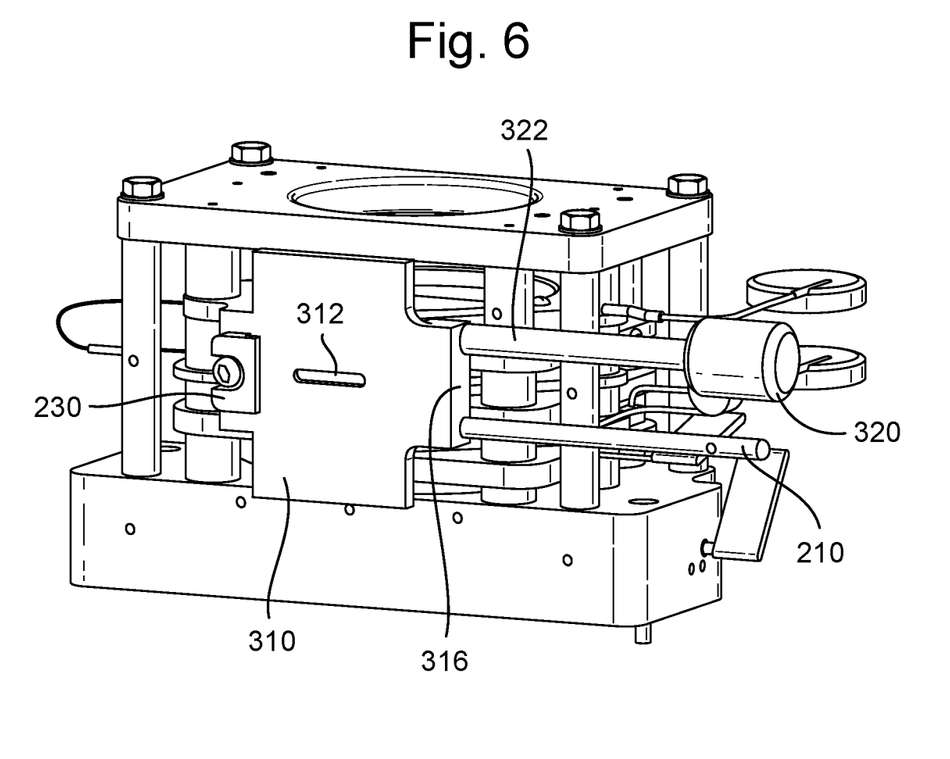
FIG. 6 shows schematically a front view of an aperture plate sub-assembly attached to a pusher assembly in accordance with various embodiments.

FIG. 5A shows a detailed front view and FIG. 5B shows a corresponding detailed back view of the acceleration assembly 200 in accordance with various embodiments, where the aperture plate 310 is unattached to the acceleration assembly 200. FIG. 6 shows a detailed front view of the acceleration assembly 200 according to various embodiments, where the aperture plate 310 is attached to the acceleration assembly 200.

Although according to the embodiments illustrated in FIGS. 5 and 6, the attachment sub-assembly (to which the aperture plate 310 may be attached) forms part of and/or is attached to the acceleration assembly 200, it would also be possible for the attachment sub-assembly to form part of and/or to be attached to any other suitable part (assembly) of the analytical instrument 100.

Thus, according to various embodiments, an aperture plate assembly is provided that comprises a first sub-assembly 300 comprising an aperture plate 310 and optionally a control such as a handle 320, and a second sub-assembly comprising a guide 210.

The first sub-assembly 300 comprises an aperture plate 310, and so may accordingly be referred to as an aperture plate sub-assembly 300. The aperture plate 310 may be in the form of a (metal, such as stainless steel) plate, and may comprise an aperture 312. When installed (when attached to the second sub-assembly (and when positioned in the first position)), the aperture plate 310 may be arranged in a generally vertical orientation.

The aperture 312 is in various embodiments configured such that ions can pass through the aperture 312. As shown in FIGS. 5A-6 the aperture 312 may be in the form of a (horizontal) slot, although the aperture may have any other suitable shape (such as being circular).

The first sub-assembly 300 may also comprises a control such as a handle 320 which may be connected to the aperture plate 310 so as to allow manipulation (movement) of the aperture plate 310 using the control (handle 320) (as will be described in more detail below).

The second sub-assembly may form part of, or may be attached to the acceleration assembly 200 of the analytical instrument 100. The second sub-assembly may be configured such that the first sub-assembly 300 can be removably attached to the second sub-assembly (and so the second sub-assembly may be referred to as an attachment sub-assembly). The second sub-assembly may be configured such that the aperture plate 310 can be moved into the "first" position, and the first sub-assembly 300 can be attached to the second sub-assembly without having to dissemble, remove or disturb the second sub-assembly from the acceleration assembly 200.

The second sub-assembly may comprise a plate or block 220 to which the first sub-assembly 300 may be attached (secured). The plate or block 220 may form part of or may be attached to the acceleration assembly 200, for example by suitable fasteners such as screws of Allen bolts.

The plate or block 220 may be in the form of a (metal, such as stainless steel) plate or block, and may comprise an aperture 222 such as a slot. The plate or block 220 may be arranged within the analytical instrument 100 in a generally vertical orientation.

As is shown in FIG. 6, the sub-assemblies may be configured such that when the first sub-assembly 300 is attached to the second sub-assembly, the aperture plate 310 is positioned in a "first" position relative to the second sub-assembly (and accordingly relative to the acceleration assembly 200). The first position may be such that when the aperture plate 310 is positioned in the first position, ions (which are being processed and/or analysed by the analytical instrument) can pass through the aperture 312 of the aperture plate 310, and into the acceleration assembly 200.

The first position may be such that, when the aperture plate 310 is positioned in the first position, the aperture plate 310 is arranged generally in a vertical orientation.

The sub-assemblies may be configured such that when the first sub-assembly 300 is attached to the (plate or block 220 of the) second sub-assembly (when the aperture plate is in the first position), the aperture 312 of the aperture plate 310 may be aligned with the aperture 222 of the plate or block 220. In various embodiments this is so that ions can be transmitted through both the aperture 312 of the aperture plate 310 and the aperture 222 of the plate or block 220 into (an acceleration region of) the acceleration assembly 200.

The aperture 222 of the (plate or block 220 of the) second sub-assembly may be larger in one or both dimensions than the aperture 312 of the aperture plate 310. This prevents ions from colliding with the plate or block 220 of the second sub-assembly, and ensures that any material build up is preferentially (or only) on the removable aperture plate 310.

The sub-assemblies may be configured such that when (at least part of) one or more faces of the aperture sub-assembly 300 contact (are pressed against) (at least part of) one or more corresponding faces of the second sub-assembly, the aperture plate 310 can be appropriately positioned (and oriented) in the first position.

In various particular embodiments, one of these faces of the aperture sub-assembly 300 is a (vertically oriented) face of the aperture plate 310, such as a (vertically oriented) back face of the aperture plate 310. In these embodiments, the corresponding face of the second sub-assembly may be a (vertically oriented) face of the plate or block 220, such as a (vertically oriented) front face of the plate or block 220 of the second sub-assembly.

Thus, according to various embodiments, the sub-assemblies are configured such that when (at least part of) a (vertically oriented) back face of the aperture plate 310 contacts (is pressed against) (at least part of) a (vertically oriented) front face of the plate or block 220 of the second sub-assembly, the aperture plate 310 may be appropriately positioned (and oriented) in the first position.

In various further embodiments, one of the faces of the aperture sub-assembly 300 is a (vertically oriented) face of a stop block 316 of the aperture sub-assembly 300, such as a (vertically oriented) side face of a stop block 316 of the aperture sub-assembly 300. In these embodiments, the corresponding face of the second sub-assembly may be a (vertically oriented) face of the plate or block 220, such as a (vertically oriented) side face of the plate or block 220 of the second sub-assembly.

Thus, in various embodiments (as shown in FIGS. 5A and 5B), the first sub-assembly 300 comprises a stop block 316 which may be attached to or formed integrally with the aperture plate 310. The stop block 316 may be configured to have at least one (vertically oriented) (side) face which is arranged to be orthogonal to the back (and front) face of the aperture plate 310. The first sub-assembly 300 may be configured such that an edge of this (side) face of the stop block 316 is joined to an edge of the (back) face of the aperture plate 310, for example so that the side face of the stop block 316 and the back face of the aperture plate 310 form a right-angle.

Correspondingly, the plate or block 220 may be configured to have at least one (vertically oriented) (side) face which is arranged to be orthogonal to the front face of the plate or block 220. The second sub-assembly may be configured such the side face of the plate or block 220 and the front face of the plate or block 220 form a right-angle The sub-assemblies may be configured such that when (at least part of) the (vertically oriented) side face of the stop block 316 contacts (is pressed against) (at least part of) the (vertically oriented) side face of the plate or block 220 of the second sub-assembly, the aperture plate 310 may be appropriately positioned (and oriented) in the first position.

According to various particular embodiments, the sub-assemblies are configured such that when (at least part of) the (vertically oriented) back face of the aperture plate 310 contacts (is pressed against) (at least part of) the (vertically oriented) front face of the plate or block 220 of the second sub-assembly, and when (at least part of) the (vertically oriented) side face of the stop block 316 contacts (is pressed against) (at least part of) the (vertically oriented) side face of the plate or block 220 of the second sub-assembly, the aperture plate 310 may be appropriately positioned (and oriented) in the first position.

As described above, the second sub-assembly comprises a guide 210. The first sub-assembly 300 may be configured to be (removably) engageable by the guide 210, for example such that when the first sub-assembly 300 is engaged by the guide 210, movement of the first sub-assembly 300 (relative to the second sub-assembly, and so relative to the acceleration assembly 200) is constrained by the guide 210.

According to various particular embodiments, when the first sub-assembly 300 is engaged by the guide 210, movement of the first sub-assembly 300 may be constrained by the guide 210 such that when the aperture plate 310 is moved towards the first position, for example by pushing the handle 320 of the first sub-assembly 300, the aperture plate 310 is guided by the guide 210 towards or into the first position. Thus, in various embodiments, the sub-assemblies are configured such that, when the first sub-assembly 300 is engaged by the guide 210, the aperture plate 310 can be pushed into the first position, for example using the control such as using the handle 320. In other words, in these embodiments, pushing the handle 320 causes the aperture plate 310 to be moved towards or into (guided towards or into) the first position.

The guide 210 may take any suitable form. As shown in FIGS. 5A-6, in various particular embodiments, the guide 210 may comprise a guide rod.

However, other suitable types of guide include, for example, a guide rail, a guide slot, and the like.

In general, the guide 210 may comprise a protrusion such as a rod, and the first sub-assembly 300 may comprise a channel or passage 314 configured to accommodate the protrusion (rod). It would alternatively be possible however, for the first sub-assembly 300 to comprise a protrusion such as a rod, and the guide 210 to comprise a channel or passage configured to accommodate the protrusion (rod).

In these embodiments, the first sub-assembly 300 may be configured to be (removably) engaged by the guide 210 by moving the first sub-assembly 300 with respect to the guide 210 such that the channel or passage 314 (at least partially) surrounds the protrusion (rod) (for example such that the protrusion (rod) is inserted into the channel or passage 314). The protrusion (rod) and the channel or passage 314 may be configured such that when the channel or passage 314 (at least partially) surrounds the protrusion (rod), movement of the first sub-assembly 300 (relative to the second sub-assembly, and so relative to the acceleration assembly 200) is constrained by interaction of the (inner walls of the) channel or passage 314 with the protrusion (rod).

According to various particular embodiments, when the channel or passage 314 (at least partially) surrounds the protrusion (rod), movement of the first sub-assembly 300 may be constrained by interaction of the (inner walls of the) channel or passage 314 with the protrusion (rod), for example such that when the aperture plate 310 is moved towards the first position, for example by pushing the handle 320 of the first sub-assembly 300, the aperture plate 310 is guided by the channel or passage 314 and/or the protrusion (rod) towards or into the first position. Thus, in various embodiments, the sub-assemblies are configured such that, when the channel or passage 314 (at least partially) surrounds the protrusion (rod), the aperture plate 310 can be pushed into the first position, for example using the control (handle 320). In other words, in these embodiments, pushing the handle 320 causes the aperture plate 310 to be moved towards or into (guided towards or into) the first position.

As shown in FIGS. 5A-6, the guide 210 may comprise a protrusion such as a rod (or a channel or passage 314) having a circular or elliptical cross section. However, in general the guide 210 may have any suitable cross sectional shape. In these embodiments, the channel or passage 314 (or the protrusion) may have a corresponding (for example circular or elliptical) cross section. The channel or passage 314 may have a (slightly) larger cross sectional area than the protrusion (rod) so as to allow the first sub-assembly 300 to be moved relative second sub assembly when the channel or passage 314 is arranged to (at least partially) surround the protrusion (rod).

According to various embodiments, the guide 210 may have a generally elongated shape. As shown in FIGS. 5A-6, the guide 210 may extend in a generally horizontal direction. However, it would be possible for the guide to extend in some other non-horizontal direction.

In various particular embodiments, the guide 210 may be configured so as to extend from the second sub-assembly (from the acceleration assembly 200) to or towards a side of the analytical instrument 100, for example to or towards the access panel or flange 122. The guide may accordingly be configured so as to be capable of guiding the aperture plate 310 from the access panel or flange 122 towards the second sub-assembly (towards the acceleration assembly 200), and in embodiments toward or into the "first" position.

As shown in FIGS. 5A-6, according to various embodiments, the guide 210 comprises a protrusion such as a rod that is attached (at one of its ends) to the plate or block 220. In particular, the guide 210 may be attached (at one of its ends) to (a lower part of) the above described side face of the plate or block 220. However, it would also be possible for the guide 210 to be attached to any other part of the plate or block 220, or indeed any other part of the second sub-assembly or the acceleration assembly 200. In these embodiments, the other end of the protrusion (rod) may extend (point) to or towards a side of the analytical instrument 100, for example to or towards the access panel or flange 122.

As shown in FIGS. 5A-6, according to various embodiments the channel or passage 314 is arranged in (and may extend through) the stop block 316. In particular, the channel or passage 314 may be arranged in (and may extend through) (a lower part of) the above described side face of the stop block 316. However, it would be possible for the channel or passage 314 to be arranged in (and extend through) any other part of the first sub-assembly 300. Thus, the (stop block 316 of the) first sub-assembly 300 may comprise a channel or passage 314 that is suitably sized to receive the guide rod 210.

In these embodiments, when the first sub-assembly is engaged by the guide 210 (when the guide rod 210 is inserted into the channel or passage 314), movement of the first sub-assembly 300 will accordingly be restricted by the guide 210 such that the first sub-assembly 300 can be moved towards or away from the first position, that is, along the axial length of the guide 210. (Although it may also be possible to rotate the first sub-assembly 300 around the guide 210.) This means that when the first sub-assembly 300 is engaged by the guide 210, pushing the first sub-assembly 300 (using the handle 320) will result in the aperture plate 310 being moved (directed or guided) to or towards the first position.

In various embodiments, the sub-assemblies may be configured such that when the aperture plate 310 is moved (pushed) towards or into the first position, the aperture plate 310 cannot then be moved (pushed) beyond the first position (in the direction of the axial length of the guide 210). According to various particular embodiments, this is achieved by the (side face of the) stop block 316 and the (side face of the) plate or block 220 interfering with (contacting) one another when the aperture plate 310 is in the first position.

Thus, according to various embodiments, the first sub-assembly comprises a (side) face, the second sub-assembly comprises a corresponding (side) face, and the sub-assemblies are configured such that when the aperture plate 310 is positioned in the first position the faces (at least partially) contact one another. As such, the sub-assemblies may be configured such that when the first sub-assembly 300 is engaged by the guide 210, the aperture plate 310 can be moved into the first position by moving (pushing) the first sub-assembly 300 until the (side) face of the stop block 316 comes into contact with the corresponding (side) face of the plate or block 220.

As described above, the sub-assemblies are configured such that the first sub-assembly 300 can be attached to (secured to) the second sub-assembly (such that the aperture plate 310 is positioned in the first position) using the control, for example using handle 320.

To achieve this, the control (handle 320) may be configured such that (when the aperture plate 310 is positioned in the first position) manipulation (movement, such as rotation) of the control (handle 320) relative to the aperture plate 310 causes the first sub-assembly 300 to become attached to (secured to) the second sub-assembly. Thus, according to various embodiments, the first sub-assembly 300 is configured such that it can be attached to the second sub-assembly by movement (for example rotation) of at least part of the control, for example handle 320, relative to the aperture plate 310.

In various embodiments, the control (handle 320) may comprise, may form part of or may be connected to an attachment device (fitting) 324 such as (male or female) screw fitting, bayonet fitting, and the like. In these embodiments, the second sub-assembly may comprise a complimentary attachment device (fitting) 224 such as a (female or male) complimentary screw fitting, bayonet fitting, and the like.

The sub-assemblies may be configured such that (when the aperture plate 310 is positioned in the first position) the first sub-assembly 300 can be attached to the second sub-assembly by attaching the attachment device 324 to the complimentary attachment device 224 using the control, for example using the handle 320. In various particular embodiments, the sub-assemblies are configured such that (when the aperture plate 310 is positioned in the first position) movement (for example rotation) of at least part of the control (handle 320) relative to the aperture plate 310 causes the attachment device 324 to be attached to complimentary attachment device 224.

For example, movement (rotation) of the control (handle 320) relative to the aperture plate 310 (when the aperture plate 310 is in the first position) may cause the attachment device 324 to engage with and become attached to the complimentary attachment device 224, for example by becoming screwed or clipped into the complimentary attachment device 224.

This may be achieved in any suitable manner. In particular, as shown in FIGS. 5A-6, the control (handle 320) may comprise or may form part of a rotatable thumb screw or nut. The handle 320 may be connected to the attachment device 324, for example via a rod 322. The rod 322 and/or the attachment device (fitting) 324 may form part of the rotatable thumb screw. The control (handle 320) (rotatable thumb screw) may also be connected to (an upper part of) the stop block 316, for example via the rod 322. In various embodiments, the control (the rotatable thumb screw) is captive to (the (upper part of) stop block 316 of) the first sub-assembly 300.

As shown in FIGS. 5A-6, the attachment device 324 may be arranged in (may protrude from) the stop block 316, and in particular may be arranged in (may protrude from) (an upper part of) the above described (side) face of the stop block 316. Correspondingly, the complimentary attachment device 224 may be arranged in the plate or block 220, and in particular may be arranged in (an upper part of) the above described (side) face of the plate or block 220.

According to various embodiments, the attachment device 324 and the complimentary attachment device 224 are configured such that when the aperture plate 310 is located in the first position, the attachment device 324 engages with (contacts) the complimentary attachment device 224.

The first sub-assembly 300 (in particular, the handle 320, the rod 322 and the stop block 316) may be configured such that movement such as rotation of the control (handle 320) (for example rotation of the thumb screw or nut) relative to the aperture plate 310 (and relative to the stop block 316), for example about an axis defined by the axial length of the rod 322, causes (corresponding) movement such as rotation of the attachment device 324 (relative to the aperture plate 310). This movement (rotation) (when the aperture plate 310 is located in the first position, and when the attachment device 324 is engaged with (contacts) the complimentary attachment device 224) may cause the attachment device 324 to become attached to complimentary attachment device 224, for example by becoming screwed or clipped into the complimentary attachment device 224.

It will accordingly be appreciated that the first sub-assembly 300 (and the aperture plate 310) can also be attached to (secured to) the second sub-assembly using the control, for example by using the handle 320.

According to various embodiments, the second sub assembly may further comprise a clip 230 which may be configured to retain the aperture plate 310 in the first position. The clip 230 may be configured such that, when the first sub-assembly 300 is moved into the first position (for example by pushing the handle 320), the aperture plate 310 can become engaged with, and retained by, the clip 230.

As shown in FIGS. 5A-6, the clip 230 may be configured to contact the aperture plate 310 (when the aperture plate 310 is in the first position) at or near to an edge of the aperture plate 310 that is opposite to an edge of the aperture plate 310 to which the control (handle 320) is attached (that is, at or near to an edge of the aperture plate 310 that is opposite to the stop block 316). The clip 230 may be configured to contact some, most or all of the edge of the aperture plate 310.

The clip 230 may be configured to hold the edge of the aperture plate 310 against the front face of the block or plate 220 of the second sub-assembly. This ensures that the aperture plate 310 is parallel to the front face of the block or plate 220 of the second sub-assembly.

It will be appreciated from the above that according to various embodiments, an aperture plate assembly is provided that comprises a first sub-assembly 300 comprising an aperture plate 310 and optionally a control such as a handle 320, and a second sub-assembly comprising a guide 210, and is configured such that when the first sub-assembly 300 is engaged by the guide 210, the aperture plate 310 can be moved (pushed) into its appropriate ("first") position relative to the second sub-assembly, for example using the control (handle 320), and can also be attached to (secured to) the second sub-assembly, for example using the control such as using the handle 320.

In various embodiments, the first sub-assembly 300 can be attached to the second sub-assembly by manipulating (moving) the first sub-assembly 300 with respect to the guide 210 (using the handle 320) such that the channel or passage 314 (at least partially) surrounds the guide 210, and then moving (pushing) the first sub-assembly 300 (using the handle 320) towards the second sub-assembly until the (side) face of the stop block 316 contacts the side face of the plate or block 220 of the second sub-assembly, the back face of the aperture plate 310 contacts the front face of the plate or block 220 of the second sub-assembly, the attachment device 324 becomes engaged with (contacts) the complimentary attachment device 224, and until the aperture plate 310 becomes engaged with (contacted by) the clip 230. This movement may be constrained by the guide 210 in the manner described above.

Once the aperture plate 310 is suitably located in the first position, the control such as the handle 320 can be rotated relative to the aperture plate 310 (and relative to the second sub-assembly) so as to cause rotation of the attachment device 324 relative to the complimentary attachment device 224 and to cause the attachment device 324 to become attached to the complimentary attachment device 224, for example by becoming screwed into the complimentary attachment device 224.

Equally, in various embodiments, the first sub-assembly 300 can be detached from the second sub-assembly by rotating the control such as the handle 320 (in an opposite direction) relative to the aperture plate 310 (and relative to the second sub-assembly) so as to cause rotation of the attachment device 324 relative to the complimentary attachment device 224 and to cause the attachment device 324 to become detached from the complimentary attachment device 224, for example by becoming unscrewed from the complimentary attachment device 224.

The first sub-assembly 300 can then be moved (pulled) (using the handle 320) away from the second sub-assembly until the first sub-assembly 300 is no longer engaged by the guide 210, such that the channel or passage 314 no longer surrounds the protrusion (rod).

This means that the aperture plate can be attached, removed and/or replaced in a particularly accurate, convenient, and straightforward manner, for example only by manipulation of the control such as only by manipulation of the handle 320. This in turn means that when it is desired to clean or replace the aperture plate 310, this can be done in a particular quick and straightforward manner.

It will accordingly be appreciated that various embodiments provide an improved aperture plate assembly.

Although the present invention has been described with reference to preferred embodiments, it will be understood by those skilled in the art that various changes in form and detail may be made without departing from the scope of the invention as set forth in the accompanying claims.

The invention claimed is:

1. An analytical instrument comprising:
a mass analyser;
an acceleration assembly; and
an aperture plate assembly comprising:
a first sub-assembly comprising an aperture plate; and
a second sub-assembly comprising a guide, wherein the first sub-assembly is configured to be attached to the second sub-assembly such that the aperture plate is positioned in a first position relative to the second sub-assembly; and
wherein the first sub-assembly and the second sub-assembly are configured such that when the first sub-assembly is engaged by the guide, the aperture plate can be moved into the first position and the first sub-assembly can be attached to the second sub-assembly;
wherein the aperture plate comprises an aperture, and wherein the analytical instrument is configured such when the aperture plate is positioned in the first position, ions can pass through the aperture;
wherein the aperture plate assembly forms part of or is arranged adjacent to the acceleration assembly; and
wherein the analytical instrument comprises an access panel configured to allow access to the aperture plate assembly.

2. The analytical instrument of claim 1, wherein the first sub-assembly and the second sub-assembly are configured such that when the first sub-assembly is engaged by the guide, the aperture plate can be pushed into the first position.

3. The analytical instrument of claim 1, wherein:
the guide comprises a protrusion, and the first sub-assembly comprises a channel or passage configured to accommodate the protrusion; or
the first sub-assembly comprises a protrusion, and the guide comprises a channel or passage configured to accommodate the protrusion.

4. The analytical instrument of claim 1, wherein the guide comprises a rod.

5. The analytical instrument of claim 1, wherein:
the first sub-assembly comprises one or more first faces; and
the second sub-assembly comprises one or more corresponding second faces;
wherein the first and second faces are configured such that when the aperture plate is positioned in the first position, at least part of the one or more first faces contacts at least part of the one or more second faces.

6. The analytical instrument of claim 5, wherein the first sub-assembly and the second sub-assembly are configured such that when the first sub-assembly is engaged by the guide, the aperture plate can be moved into the first position by pushing the first sub-assembly until at least part of the one or more first faces comes into contact with at least part of the one or more second faces.

7. The analytical instrument of claim 1, wherein the first sub-assembly comprises a control, and is configured such that the first sub-assembly can be attached to the second sub-assembly by moving at least part of the control relative to the aperture plate.

8. The analytical instrument of claim 7, wherein the first sub-assembly is configured such that the first sub-assembly can be attached to the second sub-assembly by rotating at least part of the control relative to the aperture plate.

9. The analytical instrument of claim 1, wherein:
the first sub-assembly comprises an attachment device;
the second sub-assembly comprises a complimentary attachment device; and
the first sub-assembly and the second sub-assembly are configured such that when the aperture plate is positioned in the first position, the attachment device can be attached to the complimentary attachment device.

10. The analytical instrument of claim 5, wherein the attachment device is arranged in or protrudes from one of the one or more first faces, and the complimentary attachment device is arranged in or protrudes from one of the one or more second faces.

11. The analytical instrument of claim 1, wherein the second sub-assembly further comprises a clip configured to retain the aperture plate in the first position.

12. A method of mass and/or ion mobility spectrometry, comprising passing ions through the aperture of the analytical instrument of claim 1.

13. The analytical instrument of claim 1, wherein the mass analyser is an orthogonal acceleration time of flight analyser.

* * * * *